May 28, 1963  W. PONNDORF  3,091,499
CONVEYING ARRANGEMENT FOR PULPY MATERIALS
Filed Jan. 12, 1961
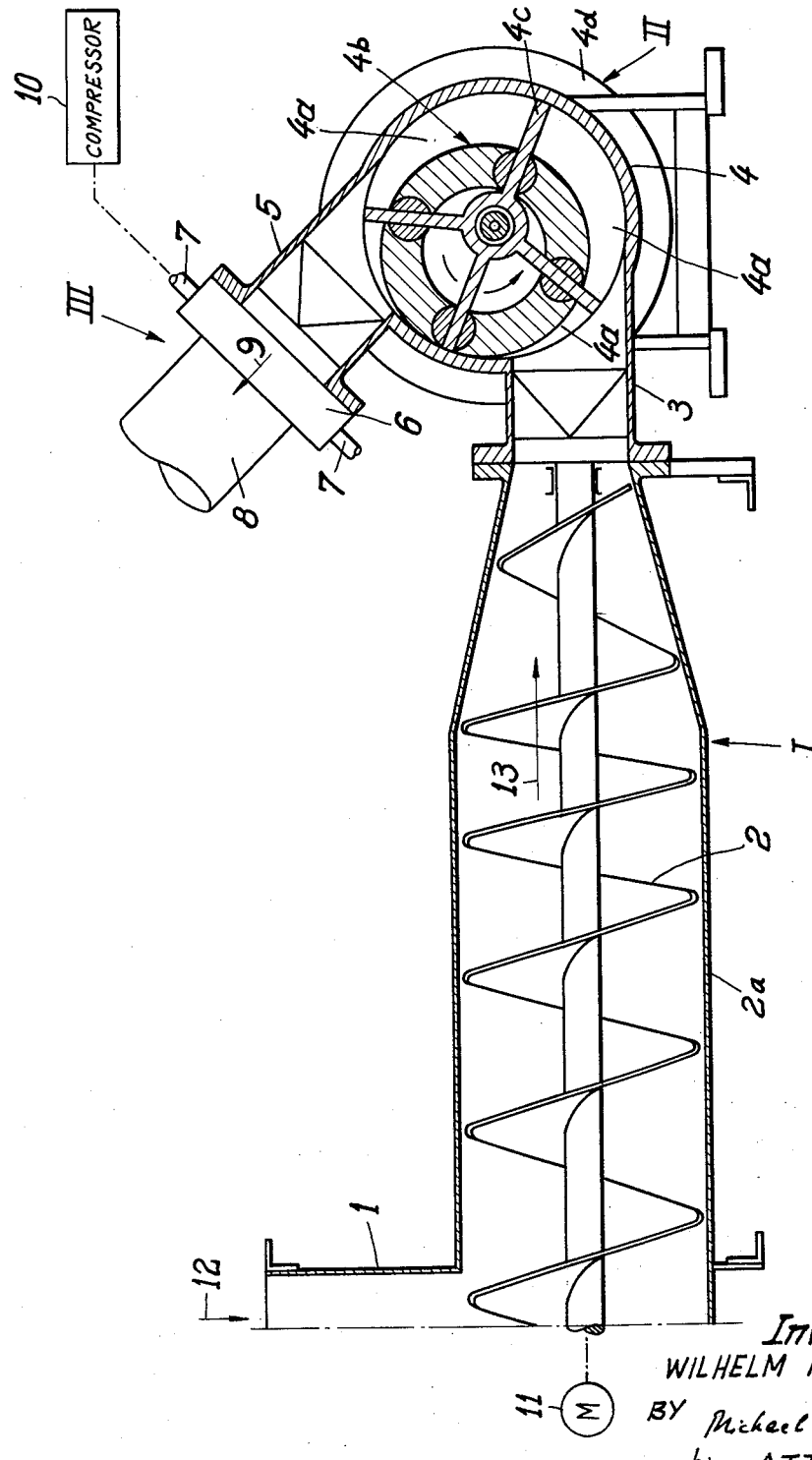
Inventor:
WILHELM PONNDORF
BY Michael S. Striker
his ATTORNEY

United States Patent Office 3,091,499
Patented May 28, 1963

3,091,499
CONVEYING ARRANGEMENT FOR PULPY MATERIALS
Wilhelm Ponndorf, Kassel, Germany, assignor to Ponndorf Maschinenfabrik K.G., Kassel-Bettenhausen, Germany
Filed Jan. 12, 1961, Ser. No. 82,280
Claims priority, application Germany Jan. 13, 1960
4 Claims. (Cl. 302—50)

The present invention relates to a conveying arrangement for thick-flowing porous materials of pulpy or mushy consistency, such as wet brewers' or distillers' grains, also known as draff, lees or dregs.

It is often necessary to transport a porous pulpy material through a considerable distance, and it is already known to convey such materials by means of a pneumatic conveyor. However, since the pressure necessary to insure that the gasiform medium will advance the pulpy material in an elongated path must reach a considerable magnitude, serious problems are encountered in insuring that the pressure in the pneumatic conveyor is not communicated to the receptacle or vessel from which the pulpy material is being withdrawn. Thus, and particularly since the material is often porous so that it cannot prevent the communication of back pressures to the collecting vessel, the customary worm conveyor which transports the material from the vessel cannot deliver the material to the pneumatic conveyor if the pressure in the pneumatic conveyor and if the porosity of the conveyed material reach a predetermined magnitude. For example, it has been found that the conveying worm will continue to deliver pulpy material if the pressure at a given point in the pneumatic conveyor reaches one atmosphere absolute pressure and if the moisture content of the material does not exceed 75 percent by weight. However, if the moisture content increases beyond 75 percent, the output of the worm conveyor decreases and rapidly drops to zero. This same phenomenon is observable if the moisture content of the pulpy material remains unchanged but if the pressure in the pneumatic conveyor increases, for example, if it is desired to transport the material through a considerable distance. In fact, it can occur that the compressed gas will "backfire" through the worm conveyor and will transform the collecting vessel into a vulcano by ejecting the pulpy material all over the plant in which the vessel is installed. This represents a danger to the personnel and entails substantial losses in time not only by halting the transportation of pulpy material but also by causing losses in manhours for cleaning up the plant. Conequently, all presently known conveying arrangements for wet brewers' grains and the like are of rather limited length.

An important object of the present invention is to provide a conveying arrangement for porous materials of pulpy or mushy consistency which is constructed and assembled in such a way that the distance through which the material may be transported substantially exceeds the distance covered by pulpy materials in conveying arrangements of presently known design.

Another object of the invention is to provide a conveying arrangement wherein the material may be subjected to much higher pressures and is advanced through greater distances without any danger that the back pressure would be communicated to the collecting vessel.

A further object of the invention is to provide a conveying arrangement of the just outlined characteristics which is of very simple construction, which can readily replace the conveying arrangements of presently known design, which may be assembled of readily available component parts, and which renders it possible to advance the pulpy materials at pressures ranging up to and even beyond five atmospheres absolute pressure.

An additional object of my invention is to provide a conveying arrangement of the above described type which will operate properly even if the delivery of pulpy material from the collecting vessel fluctuates within a wide range.

Still another object of the invention is to provide a method of conveying porous materials of pulpy consistency.

With the above objects in view, the invention resides in the provision of a conveying arrangement which comprises a mechanical conveyor for advancing the pulpy material in a first path, a pneumatic conveyor for advancing the material in an elongated second path, and means for transferring the material from the first path to the second path in such a way that the pressures prevailing in the pneumatic conveyor cannot be communicated to the mechanical conveyor so that the pneumatic conveyor may operate with a compressed gas which is maintained at a high pressure to insure that the pulpy material is transported through a considerable distance.

The mechanical conveyor preferably assumes the form of a worm conveyor, and the means which transfers the material to the pneumatic conveyor without subjecting the material in the worm conveyor to a back pressure preferably consists of a rotary pump of the positive displacement type, e.g. a rotary pump with an eccentric rotor element.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawing the single illustration of which is a somewhat schematic partly elevational and partly sectional view of a conveying arrangement embodying my invention.

Referring now in greater detail to the drawing, there is shown a conveying arrangement which comprises three main components, namely, a mechanical conveyor I, a pump II, and a pneumatic conveyor III. The left-hand end of the mechanical conveyor I communicates with a source of porous pulpy material, e.g. a collecting vessel or hopper 1, so that the material may be transported by the worm 2 in a direction to the right and through the right-hand end of the conveyor I into a transfer pipe 3 to be forced through the intake and into the cell-shaped chambers 4a of the rotary pump II. The rotary element 4b of the pump II is located eccentrically with respect to the circular housing 4 and its blades 4c seal the transfer pipe 3 from a second transfer pipe 5 which communicates with the outlet of the pump II and conveys the pulpy material into the inlet end of a tube 8 forming part of the pneumatic conveyor III. Between the inlet end of the tube 8 and the second transfer pipe 5, there is provided an annular nozzle 6 which comprises a plurality of substantially radially arranged supply conduits 7 for the introduction of a compressed gaseous fluid, so that the gas blasts discharged through the nozzle 7 advance the material through the tube 8 in the direction indicated by the arrow 9. The pump II comprises a drive means in the form of an electric motor 4d which may be directly coupled to the material transferring rotor element 4b. The compressed gas, e.g. air, is delivered from a suitable source schematically indicated as a compressor or blower 10. The worm 2 of the mechanical conveyor I is located in the confined path defined by the tubular conveyor housing 2a and is driven by a motor 11. The length of the tube 8 depends on the magnitude of the back pressure which can be taken up by the pump II.

It has been found that the capacity of the pump II need not correspond exactly to the capacity of the worm conveyor I. In fact, it is often advisable that the conveyor I operate with a certain overpressure, i.e. that the conveyor I perform the function of a compressor and deaerator, which insures rapid and complete filling of the chambers 4a. Extensive experiments in actual use of my improved conveying arrangement indicate that the arrangement operates very satisfactorily even if the consistency of the conveyed pulpy material varies within a very wide range.

Of course, the invention is not limited to the exact details of construction as shown in the drawing. For example, the annular nozzle 6 and its supply conduits 7 may be replaced by any other suitable means for introducing a compressed gas into the confined path defined by the conveying tube 8. The means utilized for conveying the material through the tube 8 may be air, steam or any other gasiform fluid.

It is equally possible to omit the worm conveyor I and to deliver the pulpy material directly from the receptacle 1 to the chambers 4a of the positive-displacement pump II. However, certain types of pulpy material, e.g. brewers' or distillers' grains, are not only of pulpy or pasty consistency but are of such porosity that they cannot be sucked into the chambers of a rotary pump because the porosity of material would cause the entry of substantial quantities of air which would reduce the output of the pump or would necessitate an increase in the dimensions of the pump. In other words, the worm conveyor I performs the function of a compressor which insures that the rotary pump II receives a continuous or nearly continuous stream of material which is entirely or substantially free of air so that the output of the pump is much higher than if the pulpy material were delivered thereto without a preceding expulsion of entrapped air. Since the rotary pumps, particularly those of the eccentric rotor type, are capable of taking up substantial back pressures, the conveying arrangement may utilize a pneumatic conveyor wherein the air blast or blasts are introduced at substantial pressure so that, and assuming that the consistency of the conveyed material remains unchanged, the tube 8 may be one of considerable length. The expenses for the electrical or other energy consumed by the drive means 4d of the pump II are more than redeemed by substantial increase in the distances through which the normally horizontal tube 8 conveys the pulpy material. Thus, while a rotary positive-displacement pump may readily take up back pressures in the range of between 4–5 atmospheres absolute pressure or even more, a conventional worm conveyor used without the pump II will be unable to transport pulpy material if the pressure in the pneumatic conveyor III reaches or approximates two atmospheres absolute pressure.

The method of transporting porous material of pulpy consistency with the help of my conveying arrangement is carried out as follows: The material is fed to the collecting vessel I in a direction indicated by the arrow 12 and is continuously transported through the confined path defined by the conveyor housing 2a in a direction from the left to the right, as indicated by the arrow 13. The stream of compressed and deaerated material passing through the pipe 3 is thereupon transferred into the second confined path defined by the tube 8 in such a way that the housing 2a remains airtightly sealed from the pneumatic conveyor. The action of blasts of compressed gasiform medium discharged by the nozzle 6 causes the material to advance through the tube 8 without any danger that the pressure of the gasiform medium would affect the operation of the conveyor I. The transfer of material from the conveyor I to the conveyor III by the pump II is practically uninterrupted because the worm 2 compresses the material stream in the housing 2a to such an extent that the chambers 4a are completely or nearly completely filled with deaerated material, especially if the output of the conveyor I exceeds at least slightly the output of the pump II. It has been found that the length of the second path defined by the tube 8 may be at least doubled if the gas is introduced at a pressure of between 2–5 atmospheres absolute pressure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An arrangement for conveying porous materials of pulpy consistency, particularly for conveying wet brewers' grains and the like, said arrangement comprising, in combination, a source of pulpy material; a worm conveyor for continuously transporting and for simultaneously compressing a stream of material from said source; a pneumatic conveyor comprising an elongated tube and nozzle means for introducing at least one blast of a compressed gasiform medium into and for thereby advancing the material through said tube; and pump means of the positive displacement type disposed between said worm conveyor and said pneumatic conveyor for transferring compressed material form said worm conveyor to said pneumatic conveyor by overcoming the back pressure of fluid and solid substances in said pneumatic conveyor and for simultaneously preventing at all times the flow of compressed gasiform medium from said tube to said worm conveyor.

2. An arrangement for conveying porous materials of pulpy consistency, particularly for conveying wet brewers' grains and the like, said arrangement comprising, in combination, a source of pulpy material; a worm conveyor for continuously transporting a stream of material from said source; a pneumatic conveyor comprising an elongated tube having an inlet end, a source of compressed gasiform medium, and nozzle means connected with said last mentioned source and located at said inlet end for introducing at least one blast of a compressed gasiform medium into and for thereby advancing the material through said tube; and rotary pump means of the positive displacement type disposed between said worm conveyor and said pneumatic conveyor for transferring the material from said worm conveyor by overcoming the back pressure of solid and fluid substances in said pneumatic conveyor to said pneumatic conveyor and for simultaneously preventing at all times the flow of compressed gasiform medium from said tube to said worm conveyor.

3. An arrangement for conveying porous materials of pulpy consistency, particularly for conveying wet brewers' grains and the like, said arrangement comprising, in combination, a collecting vessel for pulpy material; a worm conveyor having a first end communicating with said vessel and a second end, said conveyor comprising a worm and means for driving said worm whereby the latter transports a continuous stream of pulpy material from said vessel toward said second end; a pneumatic conveyor comprising an elongated tube having an inlet end, an annular nozzle provided at said inlet end, and compressor means for introducing at least one blast of a compressed gas through said nozzle and into said tube; and a rotary pump of the positive displacement type, said pump having an intake connected with the second end of said worm conveyor, an outlet connected with the inlet end of said tube, and comprising means for transferring pulpy material from said worm conveyor to said tube by overcoming the back pressure of fluid and solid substances in said pneumatic conveyor and for simultaneously preventing at all times the flow of gas from said tube to said worm conveyor.

4. An arrangement for conveying porous materials of pulpy consistency, particularly for conveying wet brewers' grains and the like, said arrangement comprising, in combination, a collecting vessel for pulpy material; a worm conveyor having a first end communicating with said vessel and a second end, said conveyor comprising a worm and means for driving said worm whereby the latter transports a continuous stream of pulpy material from said vessel toward said second end; a pneumatic conveyor comprising an elongated tube having an inlet end, an annular nozzle provided at said inlet end, and compressor means for introducing at least one blast of a compressed gas through said nozzle and into said tube; and a rotary pump of the positive displacement type, said pump having an intake connected with the second end of said worm conveyor, an outlet connected with the inlet end of said tube, and comprising eccentric rotor means for transferring pulpy material from said worm conveyor to said tube by overcoming the back pressure of fluid and solid substances in said pneumatic conveyor and for simultaneously preventing at all times the flow of gas from said tube to said worm conveyor.

References Cited in the file of this patent

UNITED STATES PATENTS

| | | |
|---|---|---|
| 1,595,362 | Schaefer | Aug. 10, 1926 |
| 1,609,401 | Crites | Dec. 7, 1926 |
| 1,941,573 | Morrow | Jan. 2, 1934 |
| 2,347,271 | Linn | Apr. 25, 1944 |
| 2,448,745 | Struckmann | Sept. 7, 1948 |
| 2,667,280 | Lane | Jan. 26, 1954 |